(No Model.)
A. MAY.
MECHANICAL MOVEMENT.
No. 309,236. Patented Dec. 16, 1884.
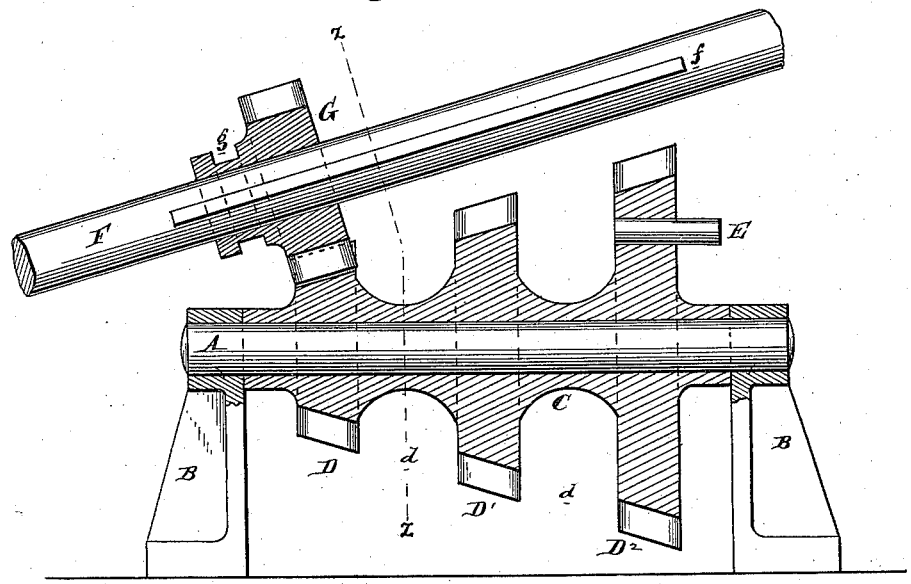
Fig. 1
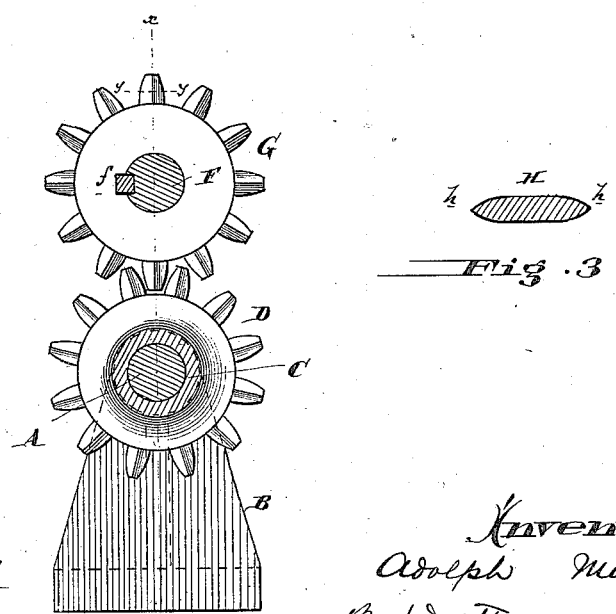
Fig. 2
Fig. 3
Attest
George E. Hummel
Harry R. Schafer
Inventor
Adolph May.
By his atty

UNITED STATES PATENT OFFICE.

ADOLPH MAY, OF BROCKPORT, NEW YORK.

MECHANICAL MOVEMENT.

SPECIFICATION forming part of Letters Patent No. 309,236, dated December 16, 1884.

Application filed May 22, 1884. (No model.)

*To all whom it may concern:*

Be it known that I, ADOLPH MAY, of Brockport, in the county of Monroe and State of New York, have made a new and useful Improvement in Mechanical Movements, of which the following is a specification.

My invention has reference to an improved form of regulating, controlling, timing, or counting device; and it consists in a novel form of construction and arrangement of two or more gears; further, in the combination of said gears with a shaft and sliding pinion, and in a novel arrangement of said pinion and its shaft relatively to the position of the gears and shaft carrying the same; further, in a novel arrangement of parts whereby the gears or pinion may be adjusted on the shaft; further, in one or more pins secured to one or more of the gears or to the pinion engaging the same; further, in a peculiar form of teeth in either the gears or pinion or in both, all of which are fully set forth in the following specification, and shown in the accompanying drawings, which form part thereof.

The object of my invention is to change the motion or velocity of rotation of a driven shaft at will by means of gears without the aid of an intermediate pinion or gear, and without arresting the motion of the driving-shaft or changing the position of either shaft or their bearings. My object is also to actuate a latch device by means of the pin or pins on the gears or pinion, which is intended to cause other mechanism to be automically set in motion at desired intervals of time.

In the drawings, Figure 1 is a sectional elevation of my improved gearing on line $x\ x$ of Fig. 2. Fig. 2 is cross-section of same on line $z\ z$ of Fig. 1. Fig. 3 is a section through one of the gears on line $y\ y$.

A is a stationary shaft, and is supported by bearings B. Upon this shaft is a loose sleeve, C, provided with two or more gears, D D' D², which may be cast integral with said sleeve, and are separated from each other by spaces $d$, of preferably a little greater width than the face of the gears. The sleeve C or one of the gears, as D², may be provided with a pin, E. These gears are of different diameters, and are preferably arranged in the form of a cone, as shown in Fig. 1, the faces of the teeth being beveled.

F is a driving-shaft, and is arranged parallel to the faces of the gears, and of course at an angle of the shaft A, and is provided with a feather, $f$. Sliding longitudinally upon said driving-shaft, but rotating with it, is the pinion G, having an annular groove, $g$, in its hub, in which a collar may work to shift the said pinion. This pinion is preferably of the same diameter as the gear D, and its teeth are adapted to mesh with the teeth of the cone of gears.

To insure the ready meshing of the pinion with either of the gears when being shifted, I form their edges knife-edged, as shown in Fig. 3.

The operation is as follows: As shown in Fig. 1, for every revolution of shaft F the sleeve C will also make one revolution. If, now, the pinion G be shifted to mesh with gear D', then for every revolution of the pinion G the sleeve makes three-quarters of a revolution. Again, if the pinion be shifted to mesh with gear D², then the sleeve will make only one-half a revolution. Consequently, to make the pin E make one revolution about shaft A it is necessary to make one or more revolutions of the pinion G. Thus it will be readily seen that any latch device may be set in motion by the pin E sooner or later, or uniformly between longer or shorter intervals of time, according as to with which of the gears D D' or D² the pinion G is made to mesh.

The diameters of the various gears may be made to suit the purpose to which the device is applied. If while the cone is being driven it is desired to stop it without stopping the rotation of the shaft F, the pinion is shifted only sufficient to place it in the space $d$ between two of the gears, and it is then free to revolve in space and without effect. It is evident that, if desired, the cone of gears may be on the driving-shaft, and the pinion G and shaft F be made to rotate with variable speeds by also shifting said pinion as before; or the pinion may be made fixed and the cone of gears arranged to be shifted.

This invention is especially adapted to harvesting-mechines for controlling the action of the gathering and binding mechanism with relation to the raking devices.

In place of arranging the gears in the form of a cone, as shown in Fig. 1, they may be arranged concentrically and in the same plane.

While I prefer the construction shown, I do not limit myself to the details, as they may be modified in various ways without departing from my invention.

Having now described my invention, what I claim as new, and desire to secure by Letters Patent, is—

1. Two or more gears of different sizes supported on the same shaft, said gears being secured together, and having the teeth of the adjacent gears separated by spaces sufficiently wide that a pinion on the driving-shaft engaging one of the gears may be moved into the clear space between the teeth of the adjacent gears, and then caused to engage directly with the next gear of different size without changing the speed of the pinion, in combination with said drive-shaft and its pinion, substantially as described.

2. The combination of a cone of gears adapted to have rotary but not reciprocatory motion, and supported on a shaft with an adjustable driving-pinion on a separate shaft attached by a feather to said shaft, and adjustable lever or its equivalent to shift said pinion, so as to engage with either one or be free from all the gears in said cone without interrupting the motion of the driving-shaft or changing the position of the bearings of either shaft, substantially as described.

3. Two or more gears of different diameters, but having the same pitch of teeth, secured together, but having the teeth in the respective gears separated by a space, in combination with a pinion adapted to mesh with said gears or be received in the space between the teeth of the same, said gears and pinion being supported as to have motion with respect to each other so that said pinion may be made to mesh with either of said gears, and one or more pins secured to one or more of said gears or pinion, substantially as described.

4. The combination of shaft F and sliding pinion G with shaft A, set at an angle to shaft F and carrying two or more gears of different sizes, said gears being secured to a common hub, substantially as described.

5. The combination of shaft F and sliding pinion G with shaft A, set at an angle to shaft F, and carrying two or more gears of different sizes, said gears being secured to a common hub, and separated from each other by spaces sufficient for the reception of said pinion G, substantially as described.

6. The combination of shaft F and sliding pinion G with shaft A, set at an angle to shaft F and carrying two or more gears of different sizes, said gears being secured to a common hub, and separated from each other by spaces sufficient for the reception of said pinion G, and a pin or pins secured to one of said wheels or hub, substantially as described.

7. The combination of shaft F and sliding pinion G with shaft A, set at an angle to shaft F and carrying two or more gears of different sizes, said gears being secured to a common hub, the edges of the teeth of said pinion and gears being practically knifed-edged, substantially as described.

8. The combination of shaft F and sliding pinion G with shaft A, set at an angle to shaft F and carrying two or more gears of different sizes, said gears being secured to a common hub, and separated from each other by spaces sufficient for the reception of said pinion G, the edges of the teeth of said pinion and gears being knife-edged, substantially as described.

In testimony of which invention I hereunto set my hand.

ADOLPH MAY.

Witnesses:
G. H. RAYMOND,
WILLIS A. SCHOUTON.